United States Patent [19]

Perchak

[11] Patent Number: 4,519,500
[45] Date of Patent: May 28, 1985

[54] DISPLAY/STORAGE PACKAGE AND FILE THEREFOR

[75] Inventor: William C. Perchak, Chicago, Ill.

[73] Assignee: Plastofilm Industries, Inc., Wheaton, Ill.

[21] Appl. No.: 570,226

[22] Filed: Jan. 12, 1984

[51] Int. Cl.³ .................. B65D 83/00; B65D 85/30; B65D 1/34

[52] U.S. Cl. .................................................. 206/312

[58] Field of Search ............ 206/312, 444, 455, 456, 206/310, 307, 309, 472; 220/339; 229/2.5 R

[56] References Cited

U.S. PATENT DOCUMENTS

| | | | |
|---|---|---|---|
| Re. 29,248 | 6/1977 | Congleton | 229/2.5 |
| 2,691,440 | 10/1954 | Spugios et al. | 206/312 |
| 3,596,822 | 8/1971 | Holley | 220/339 |
| 3,825,112 | 7/1974 | Schumaker et al. | 220/339 |
| 3,980,178 | 9/1976 | Schidlowski | 220/339 |
| 4,060,173 | 11/1977 | Dahl | 220/339 |
| 4,244,470 | 1/1981 | Burnham | 229/2.5 R |
| 4,341,307 | 7/1982 | Shyers | 220/339 |
| 4,369,879 | 1/1983 | Egley et al. | 206/472 |

FOREIGN PATENT DOCUMENTS 1030546 5/1966 United Kingdom ............ 206/309

Primary Examiner—William T. Dixson, Jr.
Assistant Examiner—Brenda J. Ehrhardt
Attorney, Agent, or Firm—Lee, Smith & Zickert

[57] ABSTRACT

A display/storage package for flat articles such as computer software discs, and a file for one or more display/storage packages. The display/storage package includes a bottom portion, a top portion complementary to the bottom portion, which, when engaged to constitute a closed package, form an internal compartment. The top and bottom portions are provided with corner assistance to aid in opening the package when closed. A hinge connects the top and bottom portions along one edge thereof and includes a longitudinal channel forming a guideway for a strip bearing indicia identifying the contents of the package. The file comprises a housing and a liner for the housing, with the liner including at least one pair of opposed grooves shaped to guide and retain the display/storage package within the file.

13 Claims, 10 Drawing Figures

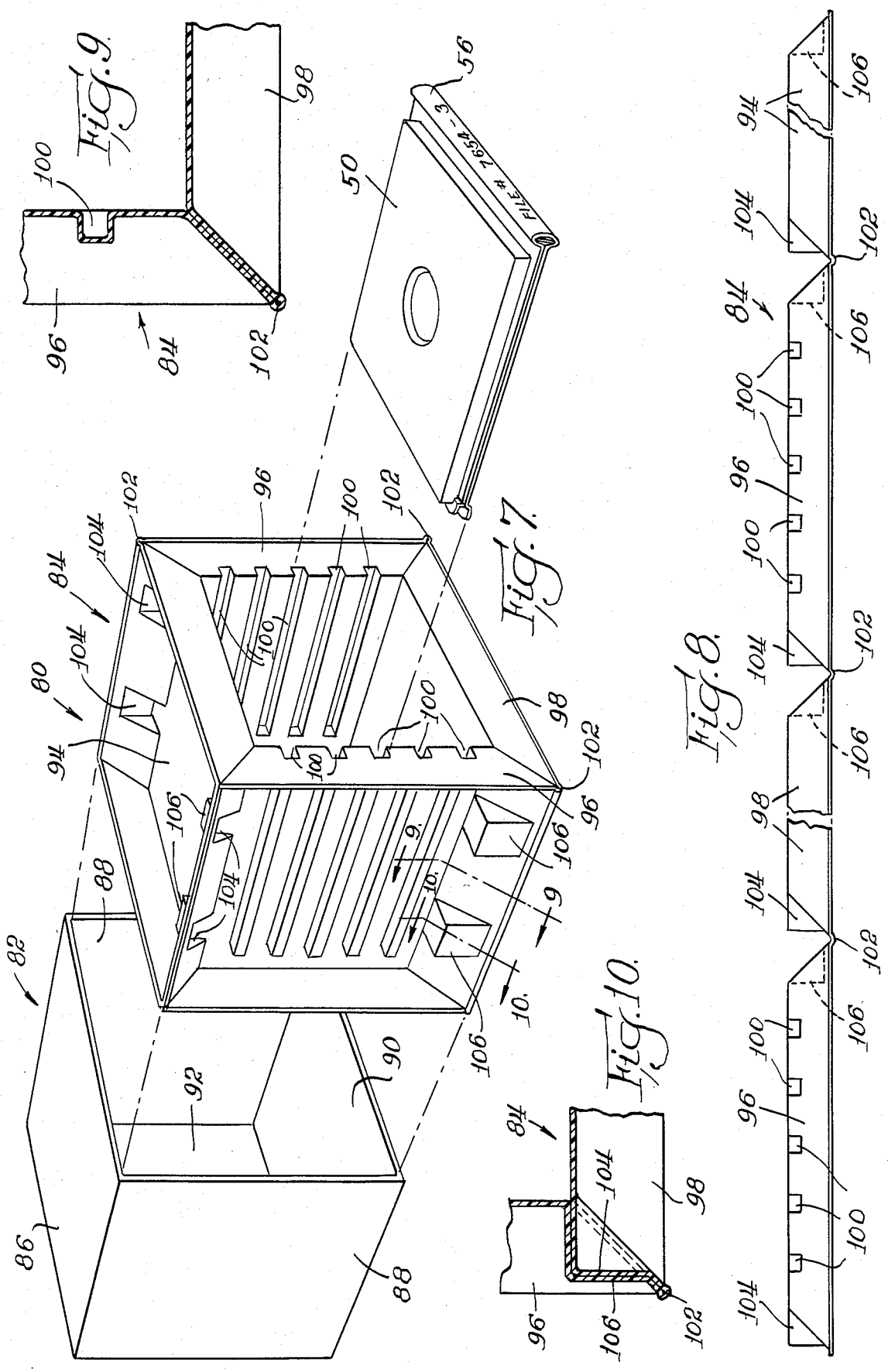

DISPLAY/STORAGE PACKAGE AND FILE THEREFOR

BACKGROUND OF THE INVENTION

This invention relates to packaging for flat articles such computer software discs, and in particular to a combination display/storage package which includes a hinge having a guideway for bearing indicia identifying the contents of the package, and to a file for the display package.

Display and storage packages for articles come in a myriad of shapes and sizes, depending on the use of the package. A typical package is made at least partially of plastic and packages of the nature of the invention are usually entirely plastic and formed by a thermo-forming process. Such a package includes a top and a bottom which may be engaged as appropriate, and a living hinge between the top and the bottom along one edge of the package.

When the package is thermo-formed, at least one edge of the top and the bottom includes a back draft so that the top and the bottom may be fastened together when closed. While the package is thus securely held together, it becomes difficult to open unless provided with a handle, knob, recess, or other means to assist opening of the package. In the typical thermo-formed package, the means of opening assistance is formed in the middle of one edge of the package but, since the package is flexible, force at the opening means tends to deform the package and actually increase the opening force necessary to open the package.

In prior art packages, an identifying label is often applied to the package or a visible card or other means of identification is slipped inside the package when the product is inserted therein. While such may be adequate in most instances, for flat packages which are stacked one above another, it becomes almost impossible to identify the contents of the package without removing the package from the stack and viewing either the label or the internal card.

SUMMARY OF THE INVENTION

The invention is an improved display/storage package for flat articles which includes, as primary components, a bottom portion and a top portion complementary to the bottom portion, the top and bottom portions, when engaged to constitute a closed package, forming an internal compartment for one or more flat articles. Means is provided for securing the top portion to the bottom portion to form the closed package, and means is provided for assisting opening of the package when it is closed. A hinge connects the top and bottom portions along one edge thereof and includes a longitudinal channel forming a guideway for bearing indicia identifying the contents of the package.

In one embodiment of the invention, a rest for articles is formed within the package. The rest comprises a raised ledge in each corner of the bottom portion which supports the four corners of a flat article contained within the package. In either embodiment of the invention, the top portion includes a central depression formed to bear against an article within the package. In the first embodiment of the invention, the depression and the ledges are formed to cooperate to suspend an article within the package. In the second embodiment of the invention, the depression simply bears against the top-most article contained within the package.

In order to secure the top and bottom portions together when closed, complementary interlocking latch elements are formed in the top portion and the bottom portion. Since the package is plastic which is thermo-formed, the latching elements comprise a back-draft in the forming process which interlock when the package is closed.

In either embodiment of the invention, a peripheral flange is formed in the top and bottom portions. The flanges contact one another when the package is closed. In order to assist opening of the package, in one embodiment of the invention a gap is provided between the flanges at the corners of the package opposite the hinge. In the other embodiment of the invention, one of the flanges overlaps the other at the same corners so that the single extended flange can be engaged for opening.

A storage file is provided for one or more of the display/storage packages. The storage file comprises a housing and a liner for the housing, with the liner including at least one pair of opposed grooves shaped to guide and retain the package within the file. The liner is composed of four segments, a top, two sides and a bottom, with the segments being formed in a longitudinal strip and with adjacent segments being joined with a living hinge. Each segment includes a snap element adjacent its living hinge with the snap element on one side of the living hinge being shaped to engage a corresponding snap element on the other side of the living hinge so that when the liner is folded about its living hinges to its quadrangular form for insertion within the housing, the snap elements interlock to retain the shape of the liner and also strengthen the housing.

BRIEF DESCRIPTION OF THE DRAWINGS

The invention is described in greater detail in the following description of examples embodying the best mode of the invention, taken in conjunction with the drawings, in which:

FIG. 7 is an exploded perspective view of a single package and the two-element file for the packages, FIG. 8 is a partial side elevational illustration of the liner for the file as it appears in a strip form before being folded into the quadrangular format shown in FIG. 7, FIG. 9 is an enlarged cross-sectional view of the liner taken along lines 9—9 of FIG. 7, and FIG. 10 is an enlarged cross-sectional view of the liner taken along lines 10—10 of FIG. 7 to show the interfitting of the snap elements of adjacent liner segments.

DESCRIPTION OF EXAMPLES EMBODYING BEST MODE OF THE INVENTION

Figure 1:
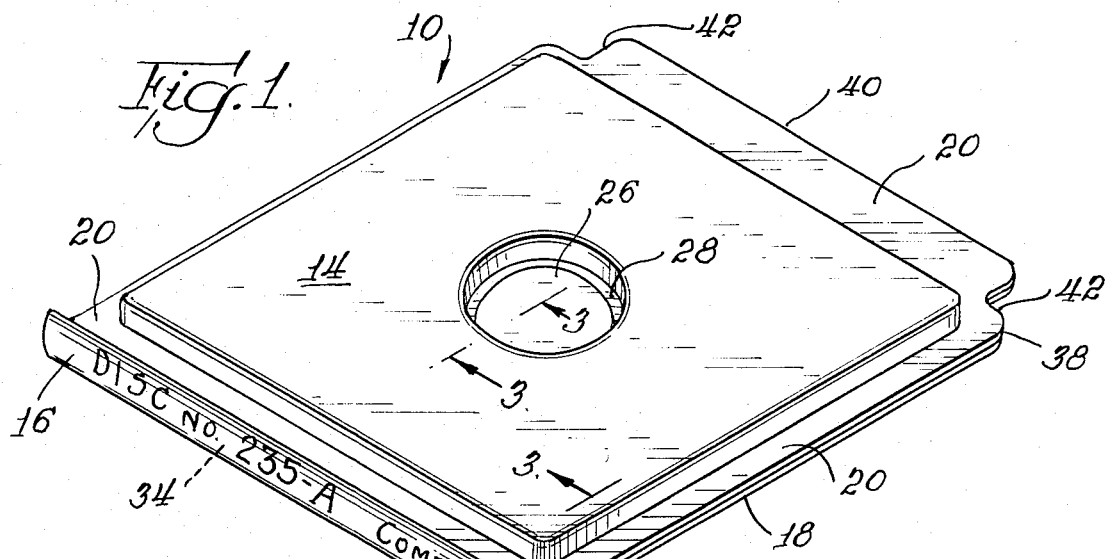
FIG. 1 is an isometric view of a closed display/storage package according to the invention.
Figure 2:
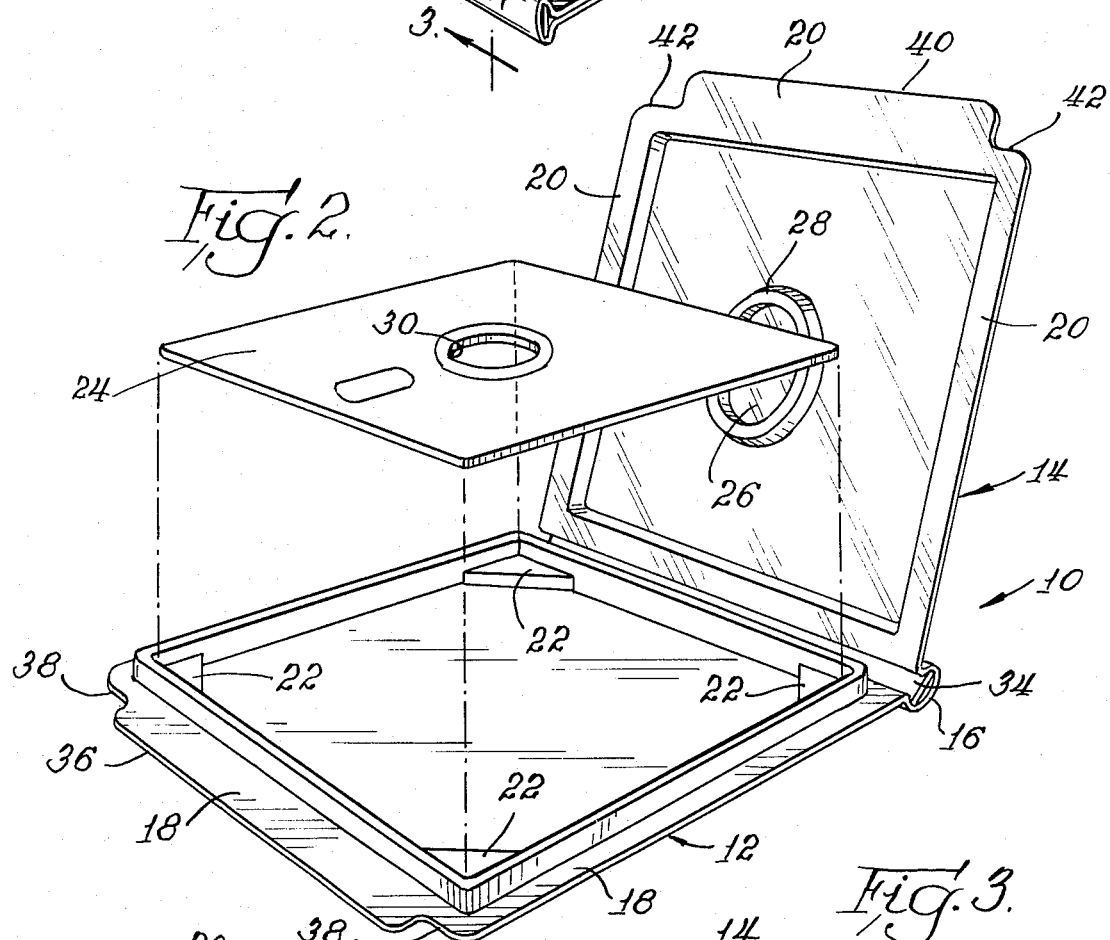
FIG. 2 is a perspective view of an opened package according to the invention showing the manner in which a flat article, such as a computer disc, is lodged within the package.
Figure 3:
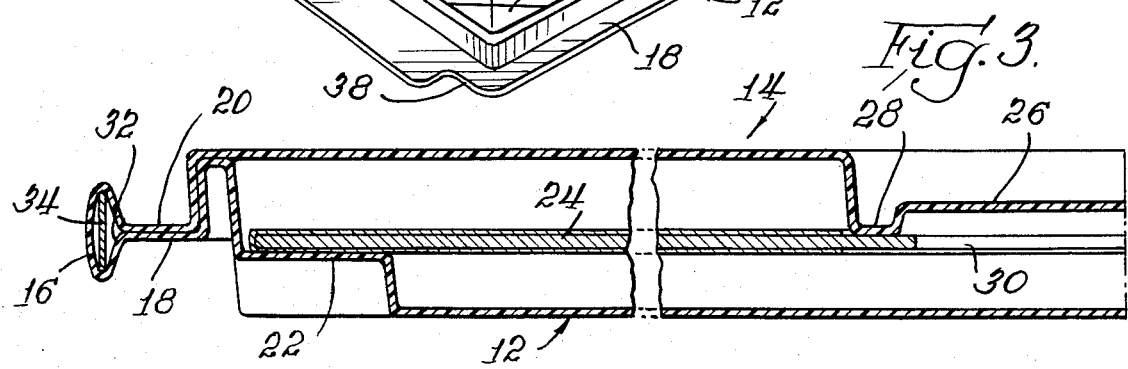
FIG. 3 is an enlarged, partial cross-sectional view of the closed package taken along lines 3—3 of FIG. 1.

One embodiment of a display/storage package according to the invention is shown generally at 10 in FIGS. 1 through 3. The package 10 includes a bottom portion 12, a top portion 14, and a hinge 16 connecting the bottom portion 12 to the top portion 14. Each of the portions 12 and 14 includes a respective peripheral flange 18 and 20 which, as shown in FIGS. 1 and 3, contact one another when the package 10 is closed.

The bottom portion 12 includes a rest for articles located within the package 10. As best shown in FIG. 2, the rest comprises a raised ledge 22 in each corner of the quadrangular bottom portion 12. The package 10 and its bottom portion 12 are shaped to accommodate a flat article, such as a computer software disc 24 with the disc 24 resting on the corner ledges 22 as shown in the drawings.

The top portion 14 is formed complementary to the bottom portion 12 so that the two portions, when closed, form an internal compartment for the computer disc 24. The top portion 14 is further provided with a circular depression 26 centrally in the top portion 14 in general alignment with the center of the disc 24 when lodged within the display package 10. As best shown in FIG. 3, the circular depression 26 includes a circular bead 28 which engages the disc 24 at the periphery of a center hole 30 of the disc 24. Thus, as shown in FIG. 3, when the package 10 is closed, the bead 28 of the circular depression 26 bears against the top of the disc 24 while the corner ledges 22 bear against the bottom of the disc 24 to firmly suspend the disc 24 midway between the bottom portion 12 and top portion 14 of the package 10.

The hinge 16 is preferably a living hinge which connects the bottom portion to the top portion 14. As best shown is FIG. 3, the hinge 16 is configured with a longitudinal channel 32 forming a guideway for a strip 34 of paper, plastic or other material shaped to be inserted within the channel 32. The strip 34 carries suitable identification for the disc 24 contained in the package 10 and, as shown, is situated so that information on the strip 34 can readily be seen when the display packages 10 are stacked one upon the other.

As shown in FIGS. 1 and 3, the flanges 18 and 20 of the bottom portion 12 and top portion 14 separate the hinge 16 from the remainder of the package 10, thus forming the hinge 16 as a handle which is particularly useful in connection with the file described below in connection with FIGS. 7 through 10. The hinge 16 therefore performs at least three functions, a hinging function, a display function for the strip 34, and a handle function for manipulating the closed package 10.

The flange 18 is extended at 36, forming corner recesses 38. Similarly, the flange 20 is extended at 40, forming corner recesses 42. Preferably, the recesses 42 and 38 are configured such that when the package 10 is closed, the flange 20 adjacent the extension 40 overlaps the flange 18 adjacent the extension 36 so that the corners 42 of the top portion 14 can be engaged to open the package 10.

Figure 4:
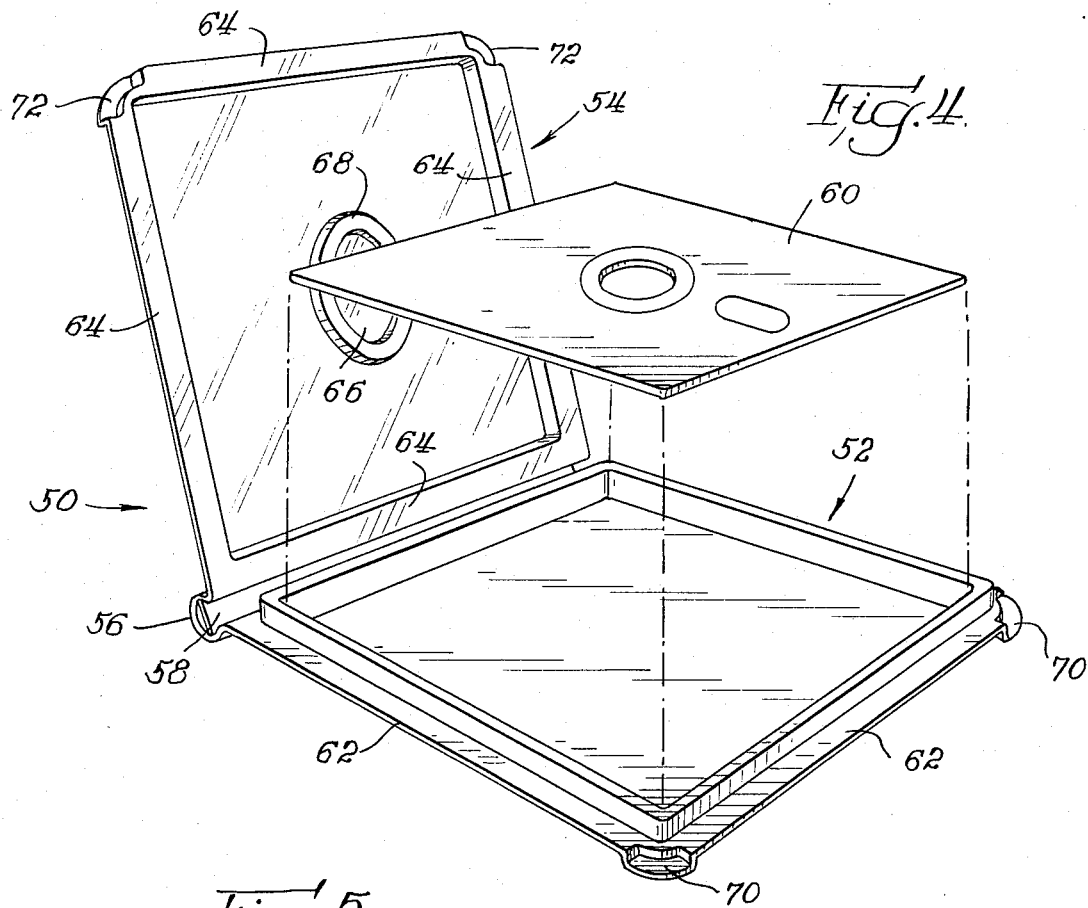
FIG. 4 is a perspective view, similar to FIG. 2, but of a second embodiment of the invention.
Figure 5:
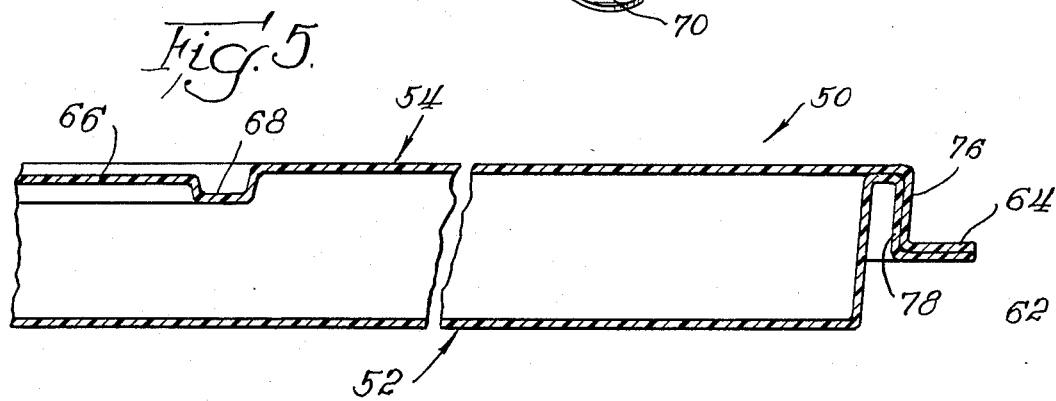
FIG. 5 is an enlarged, partial cross-sectional view of a closed package of the second embodiment of the invention.
Figure 6:
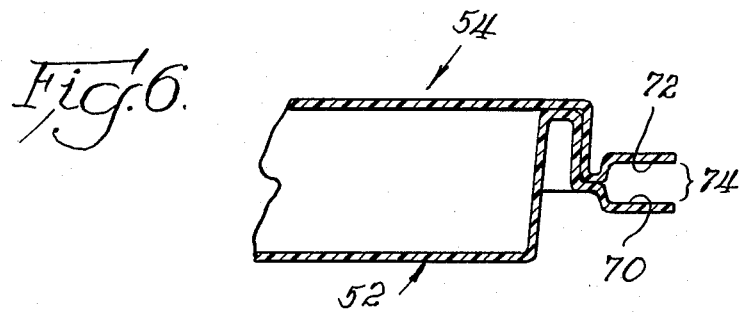
FIG. 6 is an enlarged partial cross-sectional view of a corner of the closed package of the second embodiment of the invention.

A second embodiment of the invention is shown in FIGS. 4 through 6. In this embodiment, the display/storage package, generally designated 50, includes a bottom portion 52, a top portion 54 and a hinge 56 interconnecting the bottom and top portions 52 and 54. The hinge 56 is identical to the hinge 16 of the first embodiment of the invention and, in a similar fashion, may carry a strip 58 having suitable identification for a disc 60 to be contained within the display package 50.

Like the embodiment of FIG. 1, the bottom portion 52 includes a peripheral flange 62. Likewise, the top portion 54 includes a peripheral flange 64. The flanges 62 and 64 contact one another when the package 50 is closed, as best shown in FIG. 5.

Similar to the embodiment of FIGS. 1 through 3, the top portion 54 includes a circular depression 66 having a circular bead 68. Unlike the package 10 of the first embodiment of the invention, the package 50 does not include corner ledges such as the ledges 22, and therefore more than one disc 60 can, depending on the depth of the depression 66 and bead 68, be accommodated within the package 50. The bead 68 is, similar to the first embodiment of the invention, intended to engage the periphery of the central hole of the top-most disc 60 within the package 50.

A dimple 70 is formed in the flange 62 at each corner of the bottom portion opposite the hinge 56. Similarly, a dimple 72 is formed in the flange 64 at each corner of the top portion 54 opposite the hinge 56. When the package 50 is closed, and as best shown in FIG. 6, the dimples 70 and 72 form a gap 74 at the corners of the package 50 which permit one to easily insert a finger tip between the dimples 70 and 72 to open the package 50.

In either embodiment of the invention, the top portion 14 or 54 fits over the respective bottom portion 12 or 52 when the respective package 10 or 50 is closed. The top and bottom portions are snapped together in order to lock them in the closed orientation. While the particular means of interfitting the top and bottom portions for secure closure forms no part of the present invention, a particular means is shown in FIG. 5. As seen, the top 54 has a back drafted mostly vertical leg 76 to which the flange 64 is attached. Similarly, the bottom portion 52 has a back drafted mostly vertical leg 78 to which the flange 62 is attached. The back drafts of the legs 76 and 78 cause the top portion 54 to snap over the bottom portion 52 when closed, in a conventional fashion. The back draft of the legs 76 and 78 may continue about the entire peripheries of the top portion 54 and bottom portion 52, or any part thereof, as desired.

One form of a file, generally designated at 80, for the display/storage packages 10 or 50 is shown in FIGS. 7 through 10. Although the display/storage package 50 is shown in association with the various elements of the file 80, it is evident that the display/storage package 10 or any similar, flat package, could be employed in conjunction with the file 80, as set forth in greater detail below.

The file 80 is composed of two basic components, a housing 82 and a liner 84 for the housing 82. As shown, the housing 82 is a simple, box-like structure having a top 86, opposed side walls 88 and a bottom 90. Although it is preferred that the housing 82 also include a rear wall 92, such is not essential and may be omitted if desired. The housing 82 is preferably formed from plastic in a conventional fashion, such as by thermo-forming. It may, as well, be made of other materials such as cardboard which is formed into the cubical shape shown.

The liner 84 is, similar to the housing 82, formed having a top 94, opposed sidewalls 96, and a bottom 98. The dimensioning of the liner 84 is such that there is a close fit between the liner 84 when assembled and inserted within the housing 82.

The side walls 96 are provided with a series of pairs of opposed grooves 100 shaped to guide and retain the package 50 within the file 80 when assembled. The dimensioning of the grooves 100 is dependent on the width of the package 50 and its flanges 62 and 64 (FIGS. 4 through 6) on the opposite sides thereof. It is evident that the shape of the grooves 100 can be varied to accommodate the particular package housed therein.

As shown in FIG. 8, the liner 84 may be thermoformed from a single strip of material with adjacent elements being interconnected by a living hinge 102. In order to maintain the configured shape of the liner 84 prior to insertion within the housing 82, each of the top 94, side walls 96 and bottom 98 is provided with a snap element adjacent the living hinges 102 so that when the liner 84 is folded into the quadrangular configuration shown in FIG. 7, that configuration is maintained. As shown best in FIG. 10, the snap elements comprise a male snap element 104 which engages a corresponding female snap element 106. The elements 104 and 106 are configured such that there is a close, tightly-retaining fit between the two so that the liner 84 is at least temporarily held in the assembled configuration (FIG. 7) before insertion within the housing 82. A pair of respective snap elements 104 and 106 can be located in each edge of the top 94, side walls 96 and bottom 98, as shown in FIG. 7.

When the file 80 is assembled, several of the display/storage packages 50 can be accommodated therein in the opposed grooves 100, and in the embodiment illustrated, five of the display/storage packages 50 can be so accommodated. Because of the configuration of the hinge 56, the hinge 56 serves as a handle to permit the user to readily grasp the package and insert the display/storage package 50 into or withdraw it from the file 80.

Various changes can be made to the invention without departing from the spirit thereof or scope of the following claims.

What is claimed is:

1. A display/storage package for flat articles, comprising
    a. a bottom portion,
    b. a top portion complementary to said bottom portion,
    c. said top and bottom portions, when engaged to constitute a closed package, forming an internal compartment,
    d. means for securing said top portion to said bottom portion to form a closed package,
    e. means providing assistance for opening the package when closed, and
    f. a peripheral planar flange of flexible material encircling said top portion and said bottom portion, each flange being located on the respective top and bottom portions so as to be in contact when said portions are closed,
    g. a combination label retainer and handle constituting continuations of said flanges and forming a hinge for connecting said top and bottom portions at one edge thereof, said combination further including continuations of said flanges transverse to said planar flanges so as to define a handle and a longitudinal channel forming a guideway for retaining indicia identifying the contents of the package.

2. A package according to claim 1 including means forming a rest for articles within the package.

3. A package according to claim 2 in which the package is generally quadrangular and in which said rest means comprises a raised ledge in each corner of said bottom portion.

4. A package according to claim 3 in which said top portion includes a central depression formed to bear against an article within said package.

5. A package according to claim 4 in which said depression and said ledges are formed to cooperate to suspend an article within said package.

6. A package according to claim 1 which said top portion includes a central depression formed to bear against an article within said package.

7. A package according to claim 1 in which said means providing assistance comprises a gap between said flanges at a corner of said package.

8. A package according to claim 1 in which said means providing assistance comprises one of said flanges overlapping the other of said flanges at a corner of said package.

9. A package according to claim 1 in which said hinge is attached to said flanges.

10. A package according to claim 1 in which said hinge is a living hinge.

11. A package according to claim 1 including a storage file for said package, said file comprising a housing and a liner for said housing, said liner including at least one pair of opposed grooves shaped to guide and retain said package within said file.

12. A package according to claim 11 in which said liner is composed of top, side and bottom segments, said segments being formed in a strip, and including a living hinge joining each adjacent segment.

13. A package according to claim 12 in which each segment includes a snap element adjacent said living hinge, each snap element on one side of said living hinge being shaped to engage a corresponding snap element on the other side of said living hinge.

* * * * *